US008166455B2

(12) United States Patent
Voss

(10) Patent No.: US 8,166,455 B2
(45) Date of Patent: Apr. 24, 2012

(54) DESKTOP APPLICATION FACTORY AND APPLICATION TEMPLATES

(75) Inventor: Laurie Voss, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1081 days.

(21) Appl. No.: 11/770,411

(22) Filed: Jun. 28, 2007

(65) Prior Publication Data
US 2009/0007054 A1 Jan. 1, 2009

(51) Int. Cl.
*G06F 9/44* (2006.01)
(52) U.S. Cl. ........ 717/106; 717/101; 717/102; 717/103; 717/120; 717/123
(58) Field of Classification Search .................. 717/106
See application file for complete search history.

(56) References Cited

U.S. PATENT DOCUMENTS

| 5,754,858 | A  | * | 5/1998  | Broman et al. ............... 717/111 |
| 6,053,951 | A  | * | 4/2000  | McDonald et al. ........... 717/109 |
| 6,246,404 | B1 | * | 6/2001  | Feigner et al. ................ 715/708 |
| 6,289,513 | B1 | * | 9/2001  | Bentwich ...................... 717/106 |
| 7,636,912 | B2 | * | 12/2009 | Saad et al. ..................... 717/109 |
| 7,707,566 | B2 | * | 4/2010  | Grover et al. ................. 717/148 |
| 7,716,634 | B2 | * | 5/2010  | Ross et al. .................... 717/106 |
| 7,761,848 | B1 | * | 7/2010  | Chaffin ......................... 717/116 |
| 2004/0015832 | A1 | * | 1/2004  | Stapp et al. ................... 717/106 |
| 2004/0268309 | A1 | * | 12/2004 | Grover et al. ................. 717/120 |
| 2005/0155016 | A1 | * | 7/2005  | Bender ......................... 717/106 |
| 2005/0268280 | A1 | * | 12/2005 | Fildebrandt ................... 717/113 |
| 2006/0161881 | A1 | * | 7/2006  | Saad et al. ..................... 717/104 |
| 2006/0168536 | A1 | * | 7/2006  | Portmann ...................... 715/762 |
| 2007/0234274 | A1 | * | 10/2007 | Ross et al. .................... 717/101 |

OTHER PUBLICATIONS

LaMonica, Martin "Andreessen adds some Ning to the Web", downloaded from <http://news.cnet.com/Andreessen-adds-some-Ning-to-the-Web/2100-1032_3-5890005.htm> on Mar. 20, 2010, (Oct. 6, 2005), 2 pages.
Developer Connection Dashcode, http://developer.apple.com/tools/dashcode/, (2007), 2 pages.
Free Software Downloads and Software Reviews—Download.com, http://www.download.com/, (2007), 9 pages.
Tucows Downloads—Download Freeware and Shareware Software, http://twcows.com/, (2006), 4 pages.
Microsoft Popfly—Popfly Frequently Asked Questions, retrieved from <http://www.popfly.com/Overview/faq.aspx>, downloaded Jun. 28, 2007, 7 pages.
"Yahoo! Widget Engine How to Build a Widget", downloaded Jun. 28, 2007, 23 pages.

* cited by examiner

*Primary Examiner* — Thomas K Pham
(74) *Attorney, Agent, or Firm* — Fiala & Weaver P.L.L.C.

(57) ABSTRACT

Methods, systems, and apparatuses for producing computer desktop applications, such as widgets, are described. A desktop application factory includes an interface and a desktop application generator. The interface enables an application developer to select a desktop application template, and to provide configuration information for the selected desktop application template. The desktop application generator is configured to generate a desktop application by configuring the selected desktop application template according to the provided configuration information.

24 Claims, 7 Drawing Sheets

DESKTOP APPLICATION FACTORY AND APPLICATION TEMPLATES

BACKGROUND OF THE INVENTION

1. Field of the Invention

The present invention relates generally to computer desktop applications.

2. Background Art

Computer users desire applications that are easy to use and that solve their particular problems with as little effort on their part as possible. Attaining this ideal situation is a challenge for application developers, because matching a particular problem precisely with an application requires customization. The more customizable that an application is, the more complicated that a user interface for the application will likely become. Accordingly, customizable applications become more complex, and thus become more complicated to configure and use. Furthermore, the performance of customizable applications can suffer as their complexity increases.

A desktop application is an example type of computer application that presents a user interface. Desktop application developers currently must choose between serving a few users very well with simpler, single-purpose applications, or serving larger numbers of users relatively less well with more powerful, customizable multi-purpose applications that are more complex to configure and use.

What is desired is a way of allowing template developers to deliver large numbers of simpler, easier to use applications that avoid the size and performance difficulties of configurable applications, while reducing the effort required to produce each individual application.

BRIEF SUMMARY OF THE INVENTION

Methods, systems, and apparatuses for producing computer desktop applications, such as desktop "widgets," are described. In a first example, application developers are enabled to select a desktop application template from a desktop application template repository. The application developer provides configuration information regarding the selected desktop application template. A desktop application is generated by configuring the selected desktop application template according to the provided configuration information.

Any number of desktop application templates may be present in the desktop application template repository. The desktop application templates may be configured in a variety of ways by application developers, to generate various types of desktop applications. In this manner, large numbers of customized desktop applications may be generated.

In another example, a desktop application factory is described. The desktop application factory includes an interface and a desktop application generator. The interface enables an application developer to select a desktop application template, and to provide configuration information for the selected desktop application template. The desktop application generator is configured to generate a desktop application by configuring the selected desktop application template according to the provided configuration information.

The interface may be configured to be accessed by human application developers and/or by automated application developers. For instance, in one example, the interface may display a form, such as a hypertext markup language (HTML) form, for entry of configuration information by a human application developer. In another example, the interface may include an application programming interface (API) configured to receive the configuration information from an automated application developer over a network.

The desktop application generator may include a validator module configured to validate the received configuration information. In another example, the desktop application generator may include a combiner module and a packager module. The combiner module may be configured to incorporate the configuration information into files of the selected desktop application template to generate a plurality of desktop application files. The packager module may be configured to package together the plurality of desktop application files.

The desktop application factory may further include a desktop application repository. The desktop application repository may be configured to store generated desktop applications, and to enable access to the generated desktop applications.

These and other objects, advantages and features will become readily apparent in view of the following detailed description of the invention. Note that the Summary and Abstract sections may set forth one or more, but not all exemplary embodiments of the present invention as contemplated by the inventor(s).

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
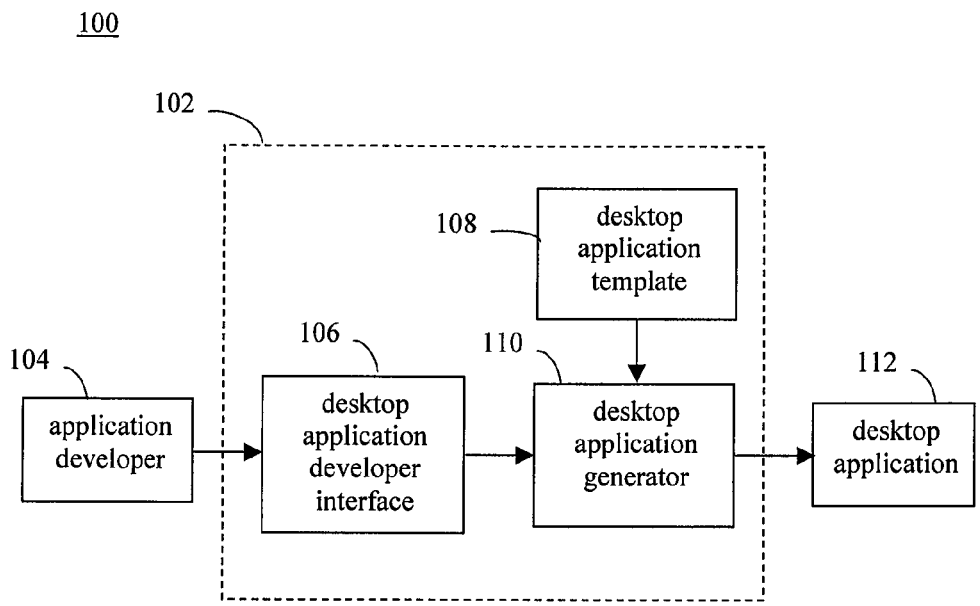
FIG. 1 shows a block diagram of a desktop application development system, according to an example embodiment of the present invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Example Applications

Embodiments of the present invention relate to all types of computer applications. One example type of application to which embodiments particularly relate is a desktop application. A desktop application is an example type of computer application (not web-based) that presents a user interface.

Some desktop applications are referred to as "widgets." Desktop widgets are typically very small applications that reside in the desktop space of a computer, and use a small amount of computer resources. Example desktop "widget" types include Yahoo! Widgets, Dashboard widgets of Apple Macintosh computers, Microsoft Gadgets, KlipFolio Klips, Google panels or gadgets, and SpringWidgets widgets.

A desktop widget is typically configured to provide information of interest to a computer user in a relatively non-intrusive manner. A common type of desktop widget enables the computer user to view information received (e.g., streamed or fed) from one or more pre-selected data sources. Desktop widgets typically present content that is selected based on a computer user's preferences. For example, a desktop widget may relay news from a particular website, count down to a specific event, fetch stock quotes for selected stock symbols, provide local weather information, or perform other types of tasks. Thousands of desktop widget applications currently exist, and their numbers are growing.

When creating a particular desktop application, the developer has to choose between serving a few users very well with a simple, single-purpose application, or serving a larger number of users relatively less well, with a more powerful, customizable multi-purpose application that is more complex to configure and use. This situation is particularly evident in the area of widgets. For any particular site or event, single-purpose widgets are more popular than more general-purpose widgets. However, creating a potentially unlimited number of single-purpose desktop applications can be very time-consuming, and in fact may be too time-consuming to be practical.

Thus, ways of assisting application developers in creating applications of varying size and complexity are desired to better serve the needs of the user community. Embodiments of the present invention enable the rapid generation of large numbers of applications. For example, embodiments for the mass production of desktop applications, such as widgets, are provided herein. Such embodiments enable large numbers of customized desktop applications to be efficiently created, each directed to more specific needs, so that there is less need for larger, more complex, customizable general purpose desktop applications. Example embodiments of the present invention are described in further detail in the following section.

Example Embodiments

The example embodiments described herein are provided for illustrative purposes, and are not limiting. Further structural and operational embodiments, including modifications/alterations, will become apparent to persons skilled in the relevant art(s) from the teachings herein.

As mentioned above, embodiments of the present invention enable the efficient generation of large numbers of desktop applications. FIG. 1 shows a desktop application development system 100, according to an example embodiment of the present invention. Desktop application development system 100 enables the efficient production of desktop applications, including customized, special purpose desktop applications such as widgets. As shown in FIG. 1, system 100 includes a desktop application factory 102. An application developer 104 interfaces with desktop application factory 102 to provide information to configure a particular type of desktop application for generation. Desktop application factory 102 generates a desktop application 112 that performs as configured by application developer 104.

As shown in the example of FIG. 1, desktop application factory 102 includes a desktop application developer interface 106, a desktop application template 108, and a desktop application generator 110. Desktop application template 108 is a template for a particular type of desktop application. For example, desktop application 108 may include desktop application logic and data, which can be conditionally included into desktop application 112, depending on a configuration chosen by application developer. Application developer 104 can configure desktop application 112 with particular data, parameters, and/or functionality by configuring desktop application template 108.

Application developer 104 is enabled to interact with desktop application template 108 at desktop application developer interface 106. For example, interface 106 may enable application developer 104 to select desktop application template 108 from a list of desktop application templates. Interface 106 enables application developer 104 to configure template 108, such as by inputting or otherwise selecting configuration data and/or parameters of template 108, adding and/or removing application logic, supplying, removing, or altering text, and/or by inputting, removing, and/or modifying graphical resources (e.g., image and/or movie files).

Desktop application generator 110 receives template 108 and the configuration information input by application developer 104 at interface 106. Desktop application generator 110 configures template 108 according to the received configuration information to generate desktop application 112. Desktop application 112 can be distributed to computer users for use on computer desktops.

In embodiments, desktop application factory 102 is capable producing a whole class of similar applications based desktop application template 108. Each individual application has a configuration based on desktop application template 108. Thus, many different desktop applications 112 can be generated from a single desktop application template 108, each configured to perform a particular task. In one example, desktop application template 108 can be a template for relaying news from a particular website. Different desktop applications 112 can be generated from such a template 108, each configured to relay news related to a different news category (e.g., world news, sports news, entertainment news) from the website, news related to different persons and/or groups, news related to different events, and/or other types of news.

After being generated, desktop application 112 runs independently of desktop application factory 102, and can be distributed amongst an unlimited number of users with similar desktop application needs. Furthermore, because they are relatively simple, desktop applications 112 created by factory 102 can be smaller and faster than an equivalent multi-purpose application performing the same task. Furthermore, desktop applications 112 may also be configured to have a more intuitive interface than multi-purpose applications, because the interface can be specific to the desktop application 112.

Desktop application factory 102, including desktop application developer interface 106 and desktop application generator 110, may be implemented in hardware, software, firmware, of any combination thereof. For example, desktop application developer interface 106 and desktop application generator 110 may each be implemented in digital logic, such as in an integrated circuit (e.g., an application specific integrated circuit (ASIC)), in code executing in one or more processors, and/or in other manner as would be known to persons skilled in the relevant art(s). In embodiments, desktop application factory 102 may be implemented in a single computer system, or may be distributed among multiple computer systems. Example computer system embodiments for factory 102 are described further below.

Figure 2:
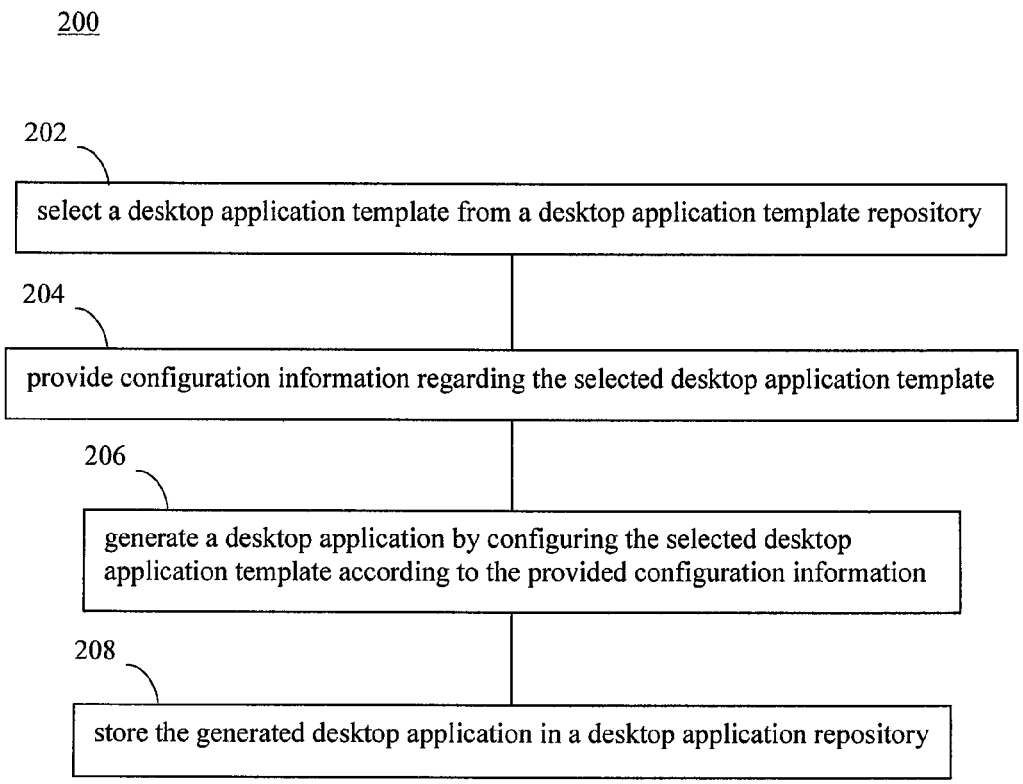
FIG. 2 shows a flowchart providing example steps for generating desktop applications, according to an example embodiment of the present invention.

FIG. 2 shows a flowchart 200 providing example steps for generating desktop applications, according to an example embodiment of the present invention. For instance, desktop application factory 102 may operate according to flowchart 200, in an embodiment. Further structural and operational embodiments will be apparent to persons skilled in the relevant art(s) based on the discussion regarding flowchart 200. Flowchart 200 is described as follows.

Figure 3:
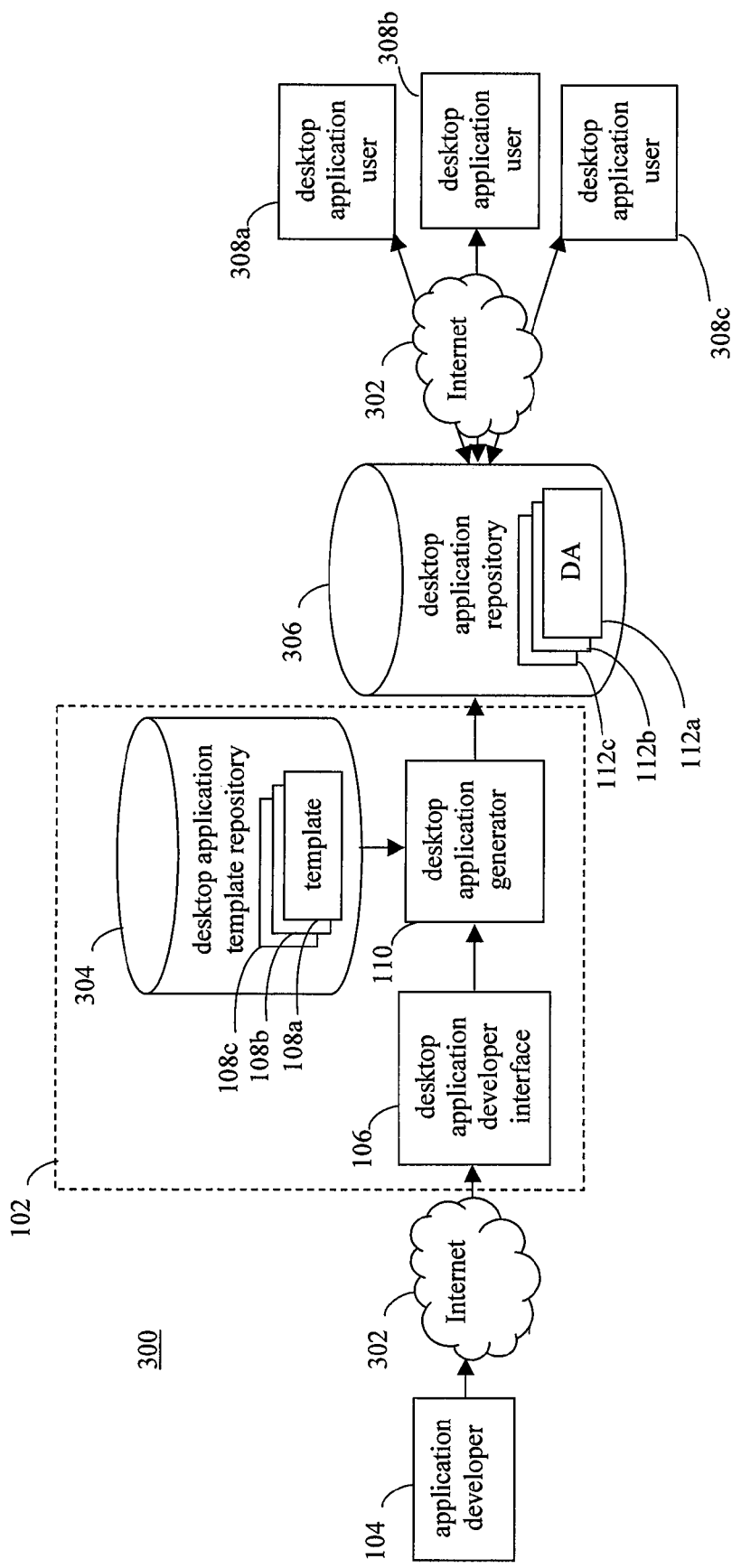
FIG. 3 shows a block diagram of a desktop application development system, which is an example of the system shown in FIG. 1, according to an embodiment of the present invention.

For illustrative purposes, flowchart 200 is described below in relation to FIGS. 3-11. FIG. 3 shows a desktop application development system 300, which is an example embodiment for desktop application development system 100 shown in FIG. 1. In system 300, application developer 104 accesses desktop application factory 102 over Internet 302. In embodiments, application developer 104 may access desktop application factory 102 over any type or size of network, including a local area network (LAN), wide area network (WAN), a combination of networks (e.g., the Internet), or other network type. Application developer 104 may access factory 102 using any type of computing device, including a desktop computer, mobile computer (e.g., a laptop, a handheld computer, etc.), a cell phone, etc.

Flowchart 200 begins with step 202. In step 202, a desktop application template is selected from a desktop application template repository. For example, as shown in FIG. 3, desktop application factory 102 includes a desktop application template repository 304. Desktop application template repository 304 is configured to store a plurality of desktop application templates 108, such as desktop application templates 108*a*-108*c* shown in FIG. 3. Any number of desktop application templates 108 may be stored in desktop application template repository 304. Desktop application template repository 304 may include one or more storage devices, such as hard disc drives, optical disc drives, semiconductor memory devices, etc., to store desktop application templates 108.

Figure 4:
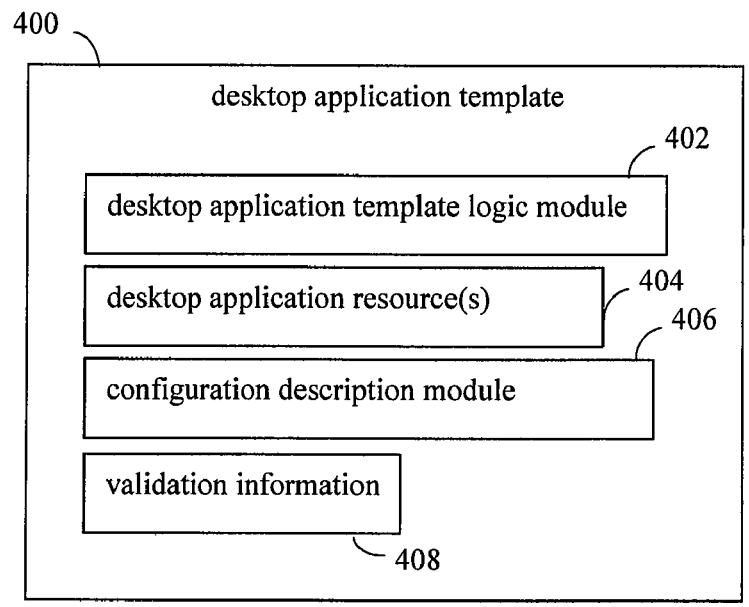
FIG. 4 shows a block diagram of a desktop application template, according to an example embodiment of the present invention.

Templates 108 may have various formats, and may include any combination of application logic, application resources, and/or further information. For instance, FIG. 4 shows an example desktop application template 400, which is an example of desktop application template 108. As shown in FIG. 4, desktop application template 400 includes a desktop application template logic module 402, one or more desktop application resources 404, a configuration description module 406, and validation information 408. In embodiments, a template 108 may include one or more of these modules and resources of template 400, and/or may include additional or alternative items.

In an embodiment, desktop application template logic module 402 includes logic, such as XML code, JavaScript code, HTML code, PHP, Perl, Java, C++, C#, VB.Net, and/or other format of code, that may be incorporated in desktop application 112 by desktop application generator 110. Desktop application template logic module 402 may include the functional logic packaged in a program, such as a script, that may be executed by desktop application generator 110 to generate one or more files of desktop application 112.

Desktop application resource(s) 404 includes one or more resources that may be included in desktop application 112, such as textual resources, sound resources (MP3 and/or other audio format), graphical resources (e.g., image files, movie files), and/or other resources. For example, the included resources may be displayed and/or played by desktop application 112 when functioning on a user's computer desktop.

When present, configuration description module 406 is configured to provide interface 106 with information indicating what data, parameters, logic, etc., of template 400 may be configured by application developer 104. For example, interface 106 may generate a form, such as an HTML form, for receiving configuration information. In an embodiment, configuration description module 406 may additionally provide description and/or instructions in the form to describe the configurable parameters/data, to indicate acceptable values/ranges for the parameters/data, and/or to provide other information to assist application developer 104 in filling out the form.

When present, validation information 408 is used to validate the configuration information request and received by configuration description module 406, to determine whether a desktop application can be generated from template 400 using the received configuration information. If the configuration information is not validated successfully, interface 106 may indicate a validation failure to application developer 104, and may request additional and/or alternative information to be provided.

Figure 5:
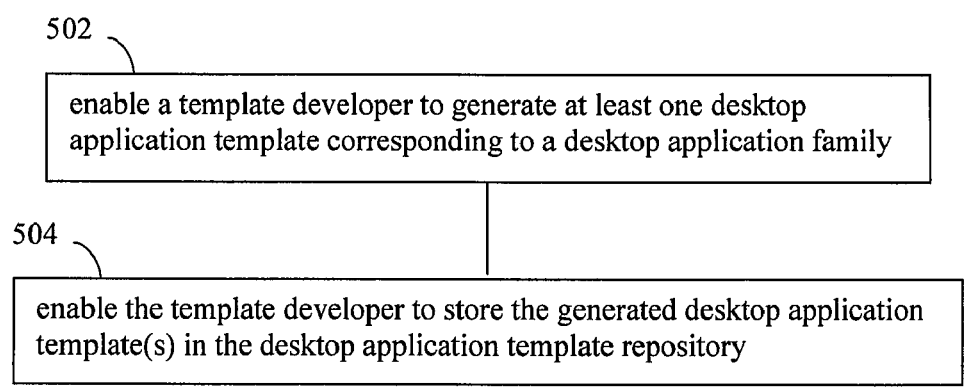
FIG. 5 shows a flowchart providing example steps for generation of desktop application templates, according to an embodiment of the present invention.

Template developers may generate templates 108, such as template 400 of FIG. 4, to be used to generate various desktop applications 112. For example, FIG. 5 shows a flowchart 500 providing example steps for generation of templates, according to an embodiment of the present invention. Flowchart 500 is described as follows.

In step 502, a template developer is enabled to generate at least one desktop application template corresponding to a desktop application type. A template developer may be enabled to generate desktop templates in a variety of ways. For example, the template developer may be enabled to code a template by using a textual code editor (e.g., using a simple text editor (e.g., Microsoft Notepad), a word processor (e.g., Microsoft Word), or other code entry tool), by using a graphical user interface to configure code in a modular fashion, or in any other suitable manner.

In step 504, the template developer stores the generated desktop application template(s) in the desktop application template repository. For example, template developers may be provided with access to desktop application template repository 304 shown in FIG. 3 in one or more ways, such as by providing a template by email, by interacting with a Web site, using FTP (file transfer protocol), and/or other way, to provide a generated template 108 to repository 304. Templates 108 submitted to repository 304 can thereafter be used to generate desktop applications 112 by application developers 104 interacting with factory 102.

In an embodiment, desktop application developer interface 106 is configured to enable application developer 104 to select a desktop application template 108 from repository 304. For example, in an embodiment, interface 106 provides a list of templates 108 that are available in repository 304 in a display of a graphical user interface, and enables application developer 104 to select a template 108 from the list. In other embodiments, a template 108 may be selected from repository 304 in alternative ways.

Figure 6:
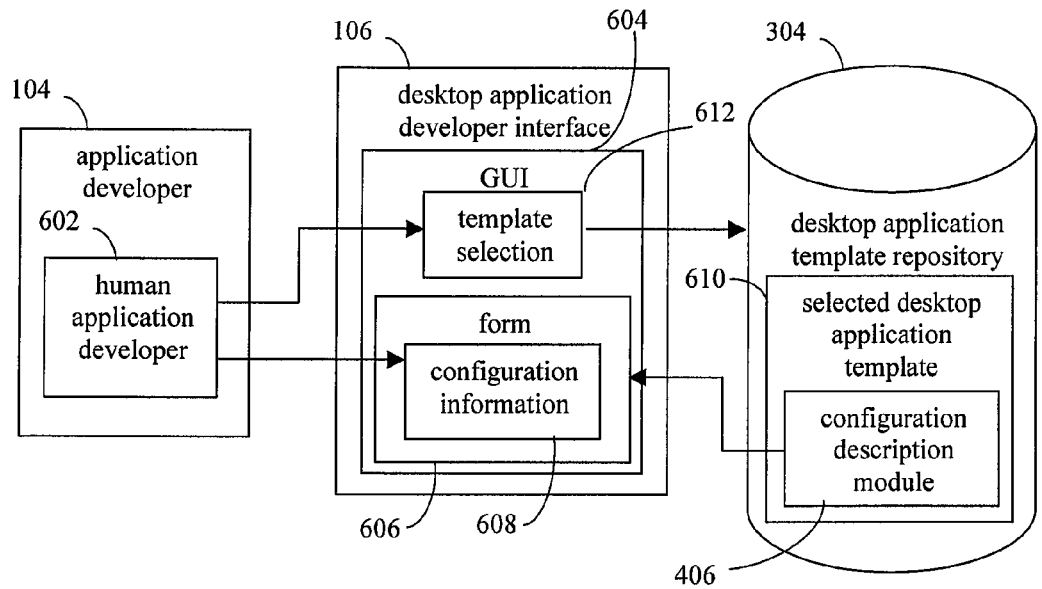
FIG. 6 shows a block diagram of a human application developer interacting with a desktop application developer interface to select and configure a desktop application template, according to an example embodiment of the present invention.

In an embodiment, application developer 104 may be a human application developer. For example, FIG. 6 shows application developer 104 including a human application developer 602. Human application developer 602 may have any level of application development experience, depending on the particular implementation of interface 106. For example, human application developer 602 may be an experienced application developer, or may be a non-technical end-user of desktop applications. Human application developer 602 does not necessarily need to understand the entire application development process, because factory 102 can generate desktop application 112 from a template 108 selected and configured by application developer 104 at interface 106. In an embodiment, interface 106 may include a user interface, such as a graphical user interface (GUI) 604, which enables human application developer 602 to request a particular template 108 from repository 304 by inputting a template selection 612. Interface 106 may be a network-based interface, such as an Internet-based Web application, or may be a local interface, such as provided by a local desktop application.

Figure 7:
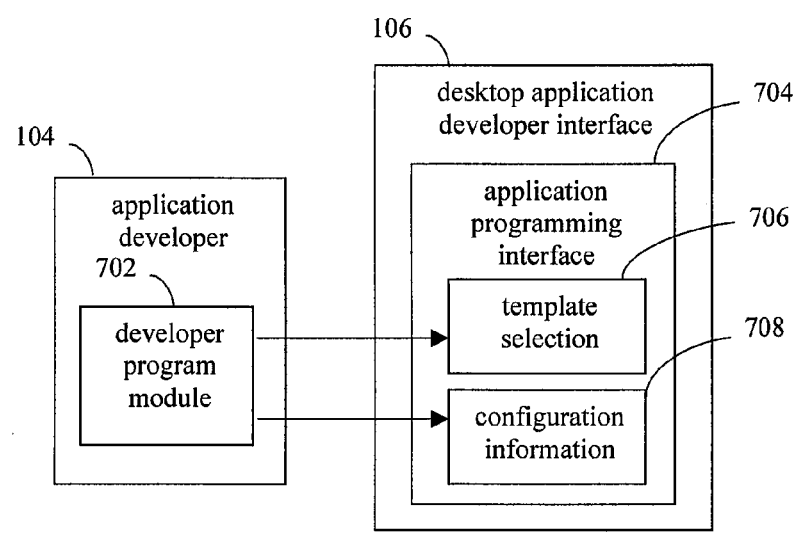
FIG. 7 shows a block diagram of an automated developer entity interacting with a desktop application developer interface to select and configure a desktop application template, according to an example embodiment of the present invention.

In another embodiment, application developer 104 may be an automated entity. For example, in an embodiment, application developer 104 may be a developer program module 702, as shown in FIG. 7. Developer program module 702 may be implemented in hardware, software, firmware, or any combination thereof. For instance, the developer program module may be a third-party application that interacts with factory 102 using an application programming interface (API) 704. This allows the possibility of pre-generating large numbers of similar applications from a database of configuration details. For example, API 704 may be a front end of a web service that includes factory 102 and enables machine-to-machine interaction. In an embodiment, developer program module 702 may communicate with API 704 in a manner prescribed by a web service description provided by API 704, in messages formatted according to Service Oriented Architecture Protocol (SOAP).

Referring back to flowchart 200 of FIG. 2, in step 204, configuration information is provided regarding the selected desktop application template. As shown in FIG. 1, application developer 104 interacts with desktop application developer interface 106 to configure template 108. In the embodiment of FIG. 6, a human application developer 602 provides configuration information 608 for a selected template 108 to interface 106. A form 606 is generated at interface 106 based on configuration description module 406 that can be filled in by developer 602. For example, form 606 may be displayed in GUI 604 of interface 106. In a web-based embodiment for interface 106, form 606 may be an HTML form, and GUI 604 may be a web browser. Human application developer 602 provides configuration information 608 by inputting and/or selecting configuration data and/or parameters in form 606.

In the example of FIG. 6, template selection 612 provided by human application developer 602 indicates a desktop application template 610 to be selected from desktop application template repository 304 (in step 202 of flowchart 200). In an embodiment, selected template 610 includes configuration description module 406, which is provided to interface 106 (according to step 204). As described above, configuration description module 406 describes to human application developer 602 parameters, data, logic, and/or other settings that developer 602 can provide in configuration information 608. For example, configuration description module 406 may configure form 606 to provide blanks and/or other input data selection mechanisms (e.g., pull down menus, check boxes, etc.) for parameters/data to be input and/or selected by developer 602 for selected template 610.

In the embodiment of FIG. 7, developer program module 702 provides a template selection 706 to interface 106 to select a desktop application template (according to step 202 of flowchart 200), and provides configuration information 708 to interface 106 to configure the selected template (according to step 204). In an embodiment, API 704 is present, and is configured to receive configuration information 708 (and template selection 706) from developer program module 702 over a network, such as a LAN or a WAN such as the Internet. In an embodiment, developer program module 702 is pre-informed of what parameters/data may be provided for the template of template selection 706, and knows a format for such parameters/data, and thus may transmit configuration information 708 with template selection 706 in a format that fulfills the requirements of the selected template.

Figure 8:
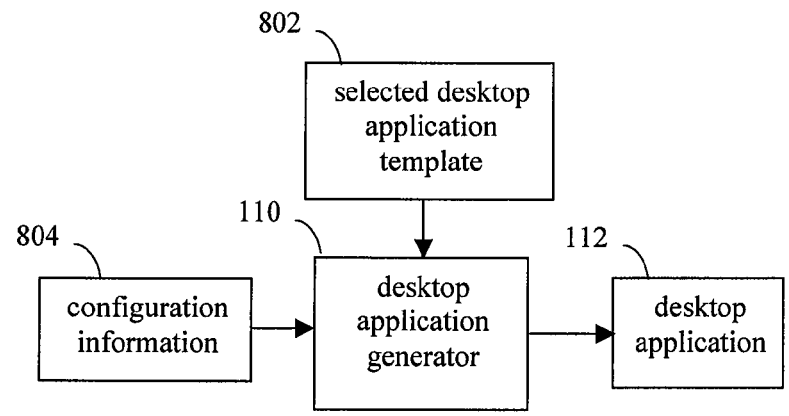
FIG. 8 shows a portion of the system of FIG. 3, according to an example embodiment of the present invention.

Referring back to flowchart 200 of FIG. 2, in step 206, a desktop application is generated by configuring the selected desktop application template according to the provided configuration information. For example, FIG. 8 shows a portion of system 300 of FIG. 3 used to illustrate step 206. As shown in FIG. 8, desktop application generator 110 receives a selected desktop application template 802 (e.g., from desktop application template repository 304 shown in FIG. 3), and receives configuration information 804 (e.g., from desktop application developer interface 106) that was input by an application developer 104 for selected template 802. For example, configuration information 804 can be configuration information 608 of FIG. 6 (input by human application developer 602) or configuration 708 of FIG. 7 (input by developer program module 702). Desktop application generator 110 is configured to generate desktop application 112 by configuring template 802 according to configuration information 804.

Figure 9:
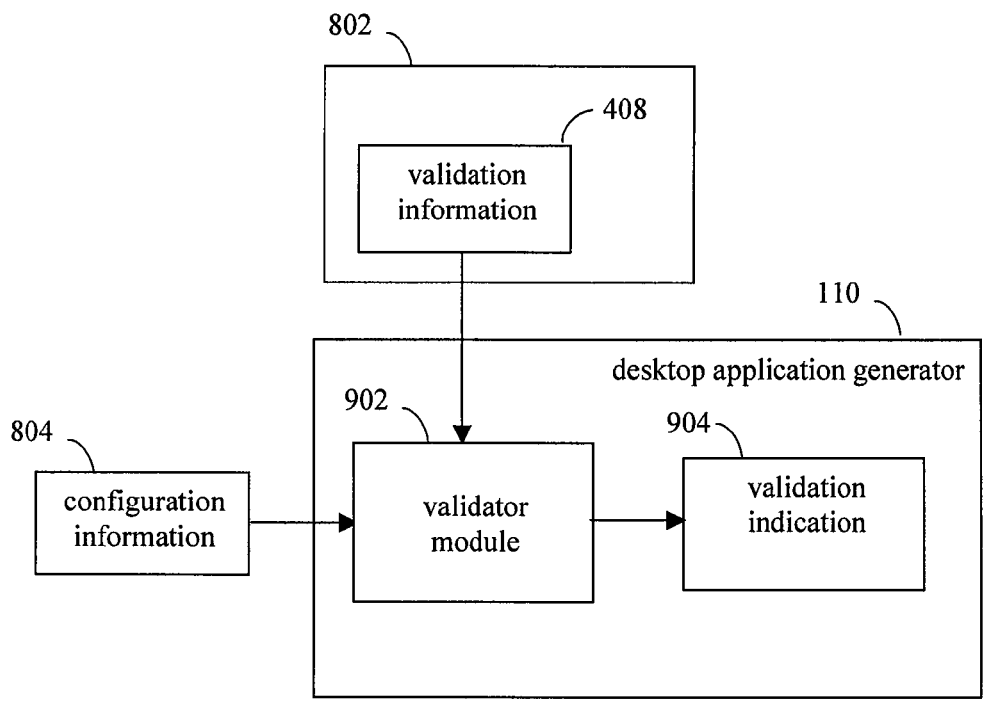
FIGS. 9 and 10 show block diagrams of a desktop application generator, according to example embodiments of the present invention.

In an embodiment, desktop application generator 110 validates configuration information 804 prior to generating a desktop application. Generator 110 may perform this function to determine that all necessary parameters/data to configure selected template 802 are present in configuration information 804, and that the parameters/data have acceptable values and/or are in acceptable ranges. For example, FIG. 9 shows desktop application generator 110 including a validator module 902. Validator module 902 receives configuration information 804 and validation information 408 (from selected template 802), and generates a validation indication 904. Validator module 902 compares configuration information 804 to the corresponding parameters/data in validation information 408 for selected template 802. If the necessary data/parameters for selected template 802 are present in configuration information 804, and have acceptable values and/or are in acceptable ranges, validator module 902 generates validation indication 904 to indicate that configuration information 804 is valid. Otherwise, validator module 902 generates validation indication 904 to indicate that configuration information 804 is invalid. In an embodiment, validation information 408 may include one or more validation routines (e.g., logic, software/firmware code, etc.) that may be executed on configuration information 804 to further validate configuration information 804. In an embodiment, validation indication 904 may be provided to interface 106, to indicate whether configuration information 804 was valid or not valid, and to request additional and/or modified configuration information if configuration information 804 is not valid. Validator module 902 may be implemented in hardware, software, firmware, of any combination thereof.

Figure 10:
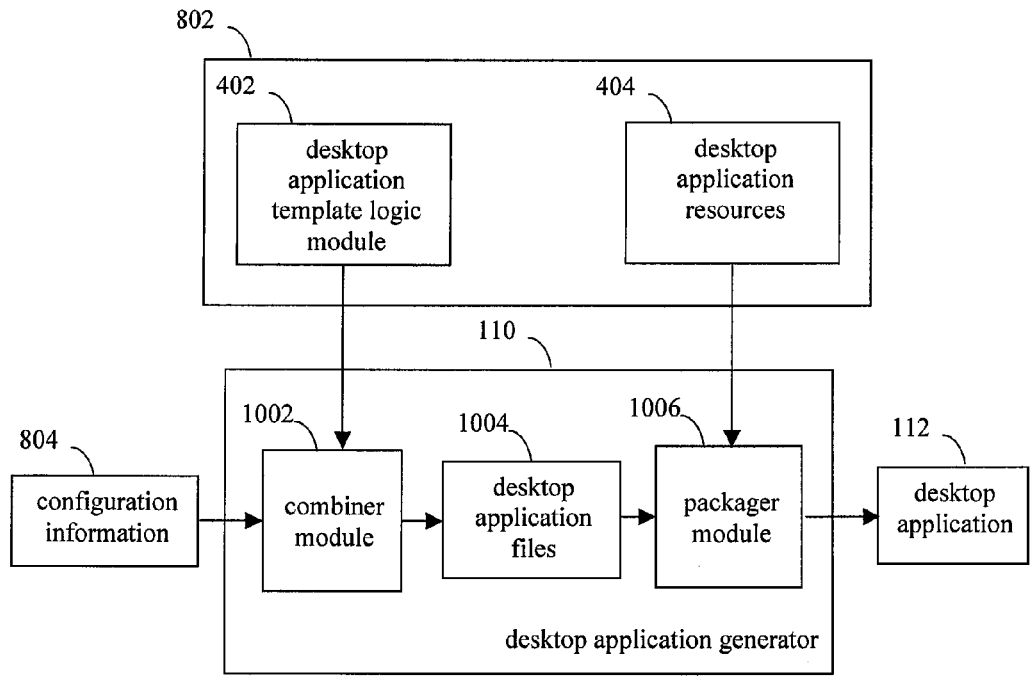

FIG. 10 shows a block diagram of desktop application generator 110, according to another example embodiment of the present invention. Desktop application generator 110 is configured to generate desktop application 112 from configuration information 804 and selected template 802. As shown in FIG. 10, generator 110 includes a combiner module 1002 and an optional packager module 1006. Combiner module 1002 and packager module 1006 are described as follows. Combiner module 1002 and packager module 1006 may be implemented in hardware, software, firmware, of any combination thereof.

Combiner module 1002 configures selected template 802 according to the provided configuration information 804. For example, as shown in FIG. 10, combiner module 1002 receives configuration information 804 (which has been optionally validated as described above) and desktop application template logic module 402 (from template 802), and generates desktop application files 1004. Combiner module 1002 incorporates the parameters/data present in configuration information 804 into the received logic of desktop application logic module 402. Combiner module 1002 may modify the received logic of logic module 402 (e.g., add logic, change logic, remove logic) according to configuration information 804. Combiner module 1002 generates one or more logic files, which include the incorporated parameters/data and modified logic of logic module 402, that are output as desktop application files 1004. Desktop application files 1004 include all logic files (e.g., XML code, JavaScript code, HTML code, PHP, Perl, Java, C++, C#, VB.Net, and/or other format of code) necessary for desktop application 112 to perform its functions. Any resources (e.g., text files, sound files, image files, video data, etc.) provided in configuration information 804 are also provided by combiner module 1002 in desktop application files 1004.

Packager module 1006 is configured to generate a packaged (e.g., bundled) desktop application 112, to simplify distribution of desktop application 112. When present, packager module 1006 receives desktop application files 1004 and desktop application resources 404 (from template 802), and packages them together to form desktop application 112. Packager module 1006 may include a conventional or proprietary file combiner and/or compressor to package files 1004 and resources 404. For example, in embodiments, packager module 1006 can package files 1004 and resources 404 into a ZIP file format, a Konfabulator™ flat file format, and/or other packaged file format. Desktop application 112 preferably is packaged into a single file, but in alternative embodiments, may be packaged into multiple files. When combiner module 1002 is configured to generate only a single file for a desktop application, packager module 1006 may not be required.

Figure 11:
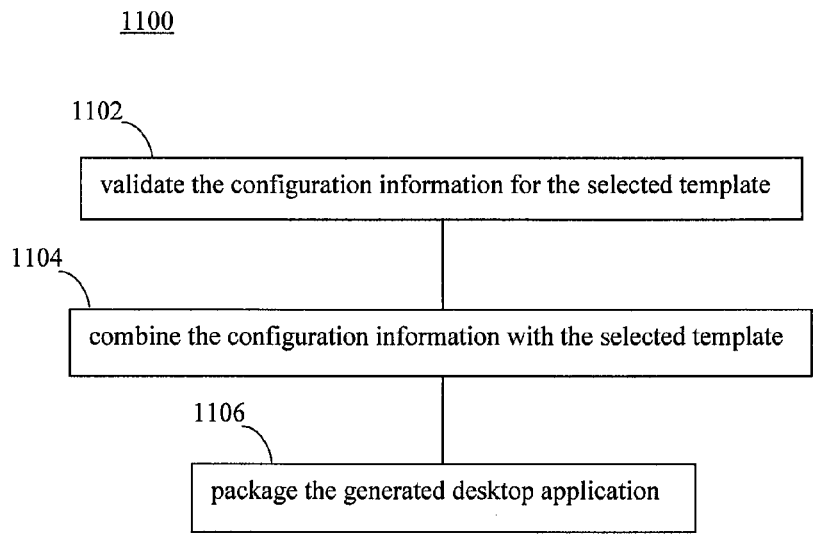
FIG. 11 shows a flowchart providing example steps for generating a desktop application, according to an embodiment of the present invention.

FIG. 11 shows a flowchart 1100 that provides example steps for generating a desktop application, according to an embodiment of the present invention. For example, desktop application generator 110 of FIG. 1 may operate according to flowchart 1100. Not all steps of flowchart 1100 need to be performed in all embodiments. Flowchart 1100 is described as follows.

In step 1102, the configuration information for the selected template is validated. For example, in an embodiment, validator module 902 shown in FIG. 9 performs step 1102. As described above with respect to FIG. 9, configuration information 804 used to configure selected template 802 is compared to the necessary parameters/data in validation information 408 for selected template 802. If the received data/parameters of configuration information 804 are present, and have acceptable values and/or are in acceptable ranges, validation indication 904 is generated to indicate that configuration information 804 is valid. Additional validation routines provided in validation information 408 may be performed to further validate configuration information 804. If configuration information 804 is determined to be valid, step 1104 may be performed.

In step 1104, the configuration information is combined with the selected template. For example, in an embodiment, combiner module 1002 shown in FIG. 10 performs step 1104. As described above with respect to FIG. 10, selected template 802 is configured according to configuration information 804. The parameters/data and/or modified logic of configuration information 804 is combined to form desktop application logic module 402. One or more logic files are generated, and the logic file(s) and any resources present in configuration information 804 are output as desktop application files 1004.

In step 1106, the generated desktop application is packaged. For example, in an embodiment, packager module 1006 performs step 1106. As described above with respect to FIG. 10, desktop application files 1004 and desktop application resources 404 (from template 802) are packaged together to form desktop application 112. Desktop application files 1004 and desktop application resources 404 may be packaged according to any suitable packaging/compression format to form desktop application 112.

Referring back to flowchart 200 of FIG. 2, in step 208, the generated desktop application is stored in a desktop application repository. For example, as shown in FIG. 3, system 300 includes a desktop application repository 306. Desktop application repository 306 is configured to store generated desktop applications 112, such as desktop applications 112a-112c shown in FIG. 3. Any number of desktop applications 112 may be stored in desktop application template repository 304. Desktop application repository 306 may include one or more storage devices, such as hard disc drives, optical disc drives, semiconductor memory devices, etc., to store desktop applications 112. Repository 306 may include the same or different storage from desktop application template repository 304.

Desktop application repository 306 is configured to enable access to users to generated desktop applications 112a-112c. For example, one or more desktop application users 308, such as desktop application users 308a-308c shown in FIG. 3, may desire to access desktop applications 112 in repository 306. Desktop applications 112 may be copied from repository 306 by users 308 for use on their own computer desktops and/or for distribution to other users. Repository 306 may have an interface (e.g., a website interface) that is accessible over a network or combination of networks, such as Internet 302, for users to interact with to download desktop applications 112.

These example embodiments may be used to generate a wide variety of desktop applications more efficiently than conventional techniques. Desktop applications 112 generated by factory 102 of FIG. 1 that have more narrowly defined functions can be smaller, faster and easier to use than conventional multi-purpose desktop applications performing similar tasks. Templates 108 allow a single developer to rapidly create large numbers of similar, but customized desktop applications 112. Interface 106 enables all types of human application developers 602 (FIG. 6), including non-technical authors, to quickly and easily produce genuinely useful and usable desktop applications 112. API 704 (FIG. 7), or other automated interface for interface 106, enables third-party applications and web sites to use factory 102 to create desktop applications to suit their purposes. Desktop application repository 306 of FIG. 3 enables application developers 104 to easily distribute the desktop applications 112 that they generate to end users.

The following section describes generation of some example "widget"-type desktop applications, to further illustrate embodiments of the present invention.

Widget Factory Example Embodiments

The following example refers to a factory application that produces widgets. This example is provided for purpose of illustration, and is not intended to be limiting. Although the example refers primarily to a Yahoo! Widget-type widget, embodiments of the present invention are applicable to all types of widgets, including Yahoo! Widgets, Dashboard widgets of Apple Macintosh computers, Microsoft Gadgets, KlipFolio Klips, Google panels or gadgets, and SpringWidgets widgets, and to further types of desktop applications other than widgets. Furthermore, although the following example relates to a widget configured to relay news from a website, all types of widget functions are encompassed by embodiments of the present invention, including utility widgets such as calculator, calendar, and clock widgets, widgets that count down to a specific event, widgets that fetch stock quotes for selected stock symbols, widgets that provide weather information, and all other possible widget functions.

In the current example, a template developer creates a template for a widget configured to relay news from a website. For a Yahoo! Widgets type widget, the template developer may create a folder/directory that includes the following files/directories:
    an applicationName.kon.php file
    a widget.xml.php file
    a resources folder containing:
    one or more resources
    a source folder containing:
    one or more script.js files
    one or more script.js.php files
    a kontext.php file "applicationName.kon.php" is a PHP script configured to generate Konfabulator XML code that is suitable for a .kon file (a ".kon" file is a file that contains the actual Yahoo! Widget code). "applicationName.kon.php" includes placeholders to be filled with configuration information. "widget.xml.php" is a PHP script configured to generate a widget.xml file (a widget.xml file specifies information about a Yahoo! Widget, such as widget name, author, etc.). "widget.xml.php" includes placeholders for configuration information. The "resources" folder is configured to store resources for a widget generated from the template. Each "Script.js" that is present is a file that contains JavaScript code that may be called by the ".kon" file of the generated widget. "Script.js" files are not modified with configuration information, and thus do not include data placeholders. Each "Script.js.php" file that is present is a PHP template script that outputs a corresponding JavaScript file that may be called by the ".kon" file of the generated widget. "Script.js.php" files include placeholders for configuration information. "kontext.php" is a file that defines a PHP class called "Kontext." The other PHP files retrieve data and exchange information with each other via the Kontext class.

Relating the files listed above to template 400 shown in FIG. 4, "applicationName.kon.php," "widget.xml.php," "Script.js," and "Script.js.php" files may be considered to be desktop application template logic module 402, resources stored in the "resources" folder may be considered to be desktop application resource(s) 404, and "kontext.php" may be considered to include both configuration description module 406 and validation information 408. These files form a template, such as template 108, that may be stored in repository 304 shown in FIG. 3. For example, these files may be placed in a subdirectory of a directory called/templates.

An application developer 104 may select the template formed by these files (according to step 202 of flowchart 200 in FIG. 2) from a list provided by a web-based GUI 612 shown in FIG. 6. In the current example, application developer 104 is a human application developer, such as human application developer 602. Developer 602 configures the template at interface 106 with configuration information (according to step 204 of flowchart 200 in FIG. 2). For example, form 606 is generated at GUI 604 based on a routine called "requestParams( )" of the PHP class Kontext of Kontext.php. "requestParams( )" includes formatting information for form 606, including the blanks, etc., that must be present in form 606 to collect configuration information, and may include instructions for filling out the configuration information in form 606. For example, "requestparams( )" may set forth format rules for the acceptability of data input into form 606 (e.g., acceptable data types and/or ranges of data). Form 606 may be an HTML form, for example. Developer 602 configures the template by inputting configuration information (e.g., inputting/selecting data/parameters/logic/resources) in form 606. Examples of configuration information are described as follows.

For example, developer 602 may be requested to enter identifying data in form 606, such as a name of the widget, a name of developer 602, an organization name, copyright information, security information, etc. Such data may be entered into placeholders in the "widget.xml.php" file when the widget is generated, for example. Developer 602 may also be prompted to select parameters related to an appearance of the widget, including a background and/or any other color scheme related to the widget, a font, font size, text color, position and type of image resources displayed on the widget, etc.

Furthermore, developer 602 may be requested to configure parameters in form 606 that will affect the function(s) of the generated desktop application. When the widget is generated, the parameters may be entered into placeholders of the "applicationName.kon.php" and "Script.js.php" files. In the current example, the selected template is designed to build a widget configured to relay news from a website. Logic (e.g., XML code) of "applicationName.kon.php" and/or logic (e.g., JavaScript) of "Script.js.php" may be configured to receive a RSS feed from a website, and to extract content from the feed, such as text and image files. In form 606, developer 602 may be prompted to enter a website from which to receive the RSS feed. For example, a blank may be present in which developer 602 can type in the website URL, a drop-down list may be present listing websites that may be selected, and/or other ways of selecting a website may be provided. Furthermore, form 606 may prompt developer 602 for keywords to search for in the RSS feed to select articles to be displayed. For example, form 606 may have a drop-down list of persons (movie stars, musicians, historical figures, politicians, etc.), events, things (e.g., countries, places, animals, songs, movies, etc.), and/or other words to be searched for in the RSS feed. Furthermore, form 606 may prompt developer 602 for numbers and types of content that the widget should provide, such as a number of articles to display at any one time, whether to play audio files, whether to display movies, etc. Thus, in an embodiment, developer 602 can configure a desktop application to provide selected information of an RSS feed of a website. In alternative embodiments, information may be obtained from websites in manners other than an RSS feed.

Still further, developer 602 may be requested to configure logic, including adding or removing logic, using form 606. Form 606 may display logic functions (e.g., XML code) in "ApplicationName.kon.php" and/or logic functions (e.g., JavaScript code) in "Script.js.php" that may be removed, so that one or more of these functions do not operate in the to-be-generated widget. In this manner, developer 602 can reduce the complexity of the to-be-generated widget by removing undesired functions. Furthermore, developer 602 may be prompted to add logic functions, such as by inserting code, attaching a script file, and/or by other means. Any sort of function may be added or removed, including a clock function, calendar function, timer function, information collecting and displaying functions (e.g., weather, news, etc.), and/or any other function.

Developer 602 may also modify resources (e.g., text files, image files, movie files, sound files, etc.) of the template using form 606. For example, developer 602 may select and delete resources in form 606, and may add new resources to be used by the generated widget, by attaching new resources to form 606 (e.g., by browsing to or entering a path to the new resource files).

After completing configuring the template, developer 602 may submit form 606. As described above with respect to FIG. 8, desktop application generator 110 receives configuration information 804 from the submitted form 606, receives the selected desktop application template 802, and generates desktop application 112. As shown in FIG. 9, generator 110 may validate configuration information 804. For example, validation module 408 of template 802 may include a routine "validateParams( )" of the PHP class of Kontext in Kontext. php. Validator module 902 may execute "validateparams( )" to validate configuration information 804.

If configuration information 804 is validated, desktop application generator 110 generates a widget as desktop application 112 (according to step 206 of flowchart 200 in FIG. 2). For example, combiner module 1002 shown in FIG. 10 may run "applicationName.kon.php" with the PHP class of Kontext in Kontext.php. This configures the logic of "applicationName.kon.php" according to configuration information 804 (collected by "requestParams( )" of Kontext. php). For example, placeholders in "applicationName.kon. php" may be filled in with configuration information 804, and XML code may be generated. Combiner module 1002 generates a file with extension ".kon" named according to the widget name parameter entered by developer 602 when providing configuration information above. Combiner module 1002 repeats this process with widget.xml.php and any *.js.php files, which generates corresponding files having their previous name with the ".php" extension removed (e.g., widget.xml, *.js). "Script.js" files originally present in the selected template are not modified by combiner module 1002. Thus, in the current example embodiment, the following files may be generated/present (as desktop application files 1004 shown in FIG. 10) after operation of combiner module 1002:

an applicationName.kon file
a widget.xml file
a resources folder containing:
modified resources
a source folder containing:
one or more script.js files (unchanged from the template)
one or more new script.js files "applicationName.kon.php" is the generated Konfabulator XML code for the generated Yahoo! Widget, configured with functionality as described above. "widget.xml" includes the information about the generated widget, such as widget name, author, etc., that was input into form 606. The "resources" folder stores resources for the widget, including one or more of the original template resources and/or one or more resources added by developer 602, as described above. The "script.js" files from the selected template are unchanged. Each new "script.js" file is configured with the functionality as described above. The "script.js" files (original and news) are JavaScript file that may be called by the ".kon" file of the generated widget.

Packager module 1006 shown in FIG. 10 bundles the generated ".kon" and ".xml" files, and the source folder (including the *.js files) and resource folder (including the resource files) into a ".widget file" as desktop application 112. The generated desktop application 112 can then be deposited into desktop application repository 306 shown in FIG. 3 (according to step 208 of flowchart 200 in FIG. 2), to be accessible to desktop application users.

Widgets of other types may be generated according to embodiments of the present invention. For example, Dashboard widgets of Apple Macintosh computers, Microsoft Gadgets, KlipFolio Klips, Google panels or gadgets, and SpringWidgets widgets may be formed in a similar manner as described above for a Yahoo! Widget, using their corresponding code (e.g., XML code, JavaScript code, HTML code, PHP, Perl, Java, C++, C#, VB.Net, etc.) and file formats, as would be known to persons skilled in the relevant art(s).

For example, a Google Gadget may be formed of XML, HTML, and JavaScript code and files. The packaged (ZIPed) Google Gadget file extension is ".gg." A KlipFolio Klip is an XML file that contains markup, styles and JavaScript. The Klip file extension is ".klip".

Example Computer Implementation

Figure 12:
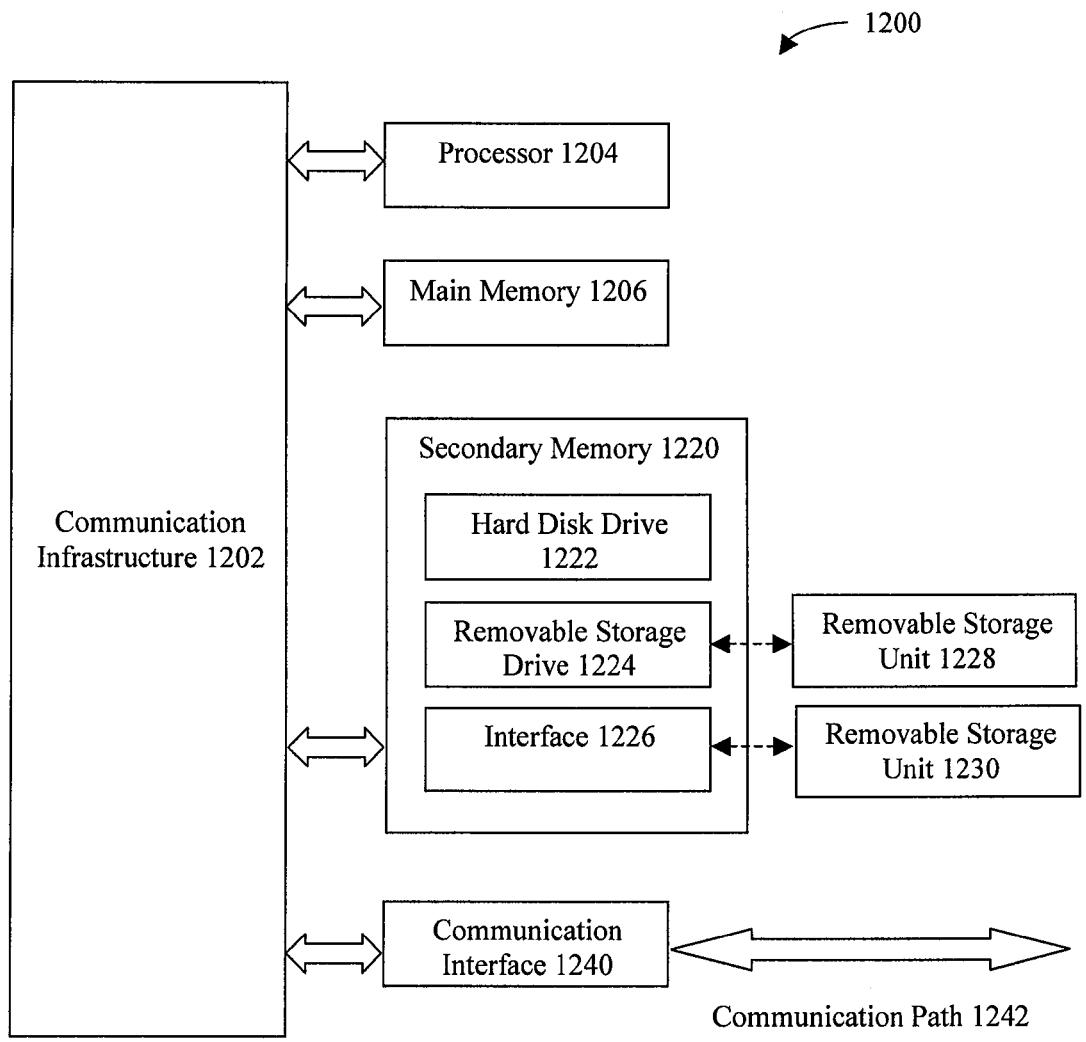
FIG. 12 is a block diagram of a computer system in which embodiments of the present invention may be implemented.

In an embodiment of the present invention, the system and components of the present invention described herein are implemented using well known servers/computers, such as computer 1202 shown in FIG. 12. For example, desktop application factory 102 shown in FIG. 1 can be implemented using one or more computers 1202.

Computer 1202 can be any commercially available and well known computer capable of performing the functions described herein, such as computers available from International Business Machines, Apple, Sun, HP, Dell, Cray, etc.

Computer 1202 includes one or more processors (also called central processing units, or CPUs), such as a processor 1206. Processor 1206 is connected to a communication bus 1204. In some embodiments, processor 1206 can simultaneously operate multiple computing threads.

Computer 1202 also includes a main or primary memory 1208, such as random access memory (RAM). Primary memory 1208 has stored therein control logic 1228A (computer software), and data.

Computer 1202 also includes one or more secondary storage devices 1210. Secondary storage devices 1210 include, for example, a hard disk drive 1212 and/or a removable storage device or drive 1214, as well as other types of storage devices, such as memory cards and memory sticks. Removable storage drive 1214 represents a floppy disk drive, a magnetic tape drive, a compact disk drive, an optical storage device, tape backup, etc.

Removable storage drive 1214 interacts with a removable storage unit 1216. Removable storage unit 1216 includes a computer useable or readable storage medium 1224 having stored therein computer software 1228B (control logic) and/or data. Removable storage unit 1216 represents a floppy disk, magnetic tape, compact disk, DVD, optical storage disk, or any other computer data storage device. Removable storage drive 1214 reads from and/or writes to removable storage unit 1216 in a well known manner.

Computer 1202 also includes input/output/display devices 1222, such as monitors, keyboards, pointing devices, etc.

Computer 1202 further includes a communication or network interface 1218. The network interface 1218 enables the computer 1202 to communicate with remote devices. For example, network interface 1218 allows computer 1202 to communicate over communication networks or mediums 1224B (representing a form of a computer useable or readable medium), such as LANs, WANs, the Internet, etc. Network interface 1218 may interface with remote sites or networks via wired or wireless connections.

Control logic 1228C may be transmitted to and from computer 1202 via the communication medium 1224B. More particularly, computer 1202 may receive and transmit carrier waves (electromagnetic signals) modulated with control logic 1230 via communication medium 1224B.

Any apparatus or manufacture comprising a computer useable or readable medium having control logic (software) stored therein is referred to herein as a computer program product or program storage device. This includes, but is not limited to, computer 1202, main memory 1208, secondary storage devices 1210, removable storage unit 1216 and carrier waves modulated with control logic 1230. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A desktop application factory, comprising:
   an interface configured to enable an application developer to provide configuration information regarding a selected desktop application template; and
   a desktop application generator configured to generate a desktop application by configuring the selected desktop application template according to the provided configuration information, the generated desktop application being a desktop widget application customized according to the provided configuration information, the desktop widget application configured to reside in the desktop space of a computer and configured to receive information streamed from at least one website.

2. The desktop application factory of claim 1, further comprising:
   a desktop application template repository configured to store a plurality of desktop application templates that include the selected desktop application template.

3. The desktop application factory of claim 1, wherein the interface is configured to enable the application developer to select the desktop application template from the desktop application template repository.

4. The desktop application factory of claim 1, wherein the interface comprises:
   a graphical user interface configured to enable a human application developer to input the configuration information into a form provided by the selected desktop application template.

5. The desktop application factory of claim 4, wherein the form is a hypertext markup language (HTML) form.

6. The desktop application factory of claim 1, wherein the application developer is a developer program module, wherein the interface comprises:
   an application programming interface (API) configured to receive the configuration information from the developer program module over the Internet.

7. The desktop application factory of claim 1, wherein the desktop application generator comprises:
   a validator module configured to validate the configuration information.

8. The desktop application factory of claim 1, wherein the desktop application generator comprises:
   a combiner module configured to incorporate the configuration information into files of the selected desktop application template to generate a plurality of desktop application files; and
   a packager module configured to package together the plurality of desktop application files.

9. The desktop application factory of claim 1, further comprising:
   a desktop application repository configured to store the generated desktop application, and to enable access to the generated desktop application.

10. A method for generating desktop applications, comprising:
    enabling an application developer to select a desktop application template from a desktop application template repository;

configuring an application programming interface (API) to receive configuration information;

enabling an application developer to provide configuration information regarding the selected desktop application template to the API over the Internet; and generating a desktop application by configuring the selected desktop application template according to the provided configuration information, the generated desktop application being a desktop widget application customized according to the provided configuration information, the desktop widget application configured to reside in the desktop space of a computer and configured to receive information streamed from at least one website.

11. The method of claim 10, further comprising:

enabling a template developer to generate at least one desktop application template corresponding to a desktop application family; and enabling the template developer to store the generated at least one desktop application template in the desktop application template repository.

12. The method of claim 10, wherein the application developer is a human application developer, wherein said enabling an application developer to provide configuration information regarding the selected desktop application template comprises:

enabling the human application developer to input the configuration information into a form provided by the selected desktop application template.

13. The method of claim 12, wherein said enabling the human application developer to input configuration data into a form comprises:

enabling the human application developer to access the form over the Internet; and displaying the form as a hypertext markup language (HTML) form.

14. The method of claim 10, wherein said generating comprises:

validating the configuration information.

15. The method of claim 10, wherein said generating comprises:

incorporating the configuration information into files of the selected desktop application template to generate a plurality of desktop application files; and packaging together the plurality of desktop application files.

16. The method of claim 10, further comprising:

storing the generated desktop application in a desktop application repository.

17. The method of claim 16, further comprising:

enabling a user to retrieve the generated desktop application from the desktop application repository.

18. A computer program product comprising a non-transitory computer usable medium having computer readable program code means embodied in said medium for generating desktop applications, comprising:

a first computer readable program code means for enabling a processor to enable an application developer to select a desktop application template from an desktop application template repository;

a second computer readable program code means for enabling a processor to enable an application developer to provide configuration information regarding the selected desktop application template; and a third computer readable program code means for enabling a processor to generate a desktop application by configuring the selected desktop application template according to the provided configuration information, the generated desktop application being a desktop widget application customized according to the provided configuration information, the desktop widget application configured to reside in the desktop space of a computer and configured to receive information streamed from at least one website.

19. The computer program product of claim 18, further comprising:

a fourth computer readable program code means for enabling a processor to enable a template developer to generate at least one desktop application template corresponding to a desktop application family; and a fifth computer readable program code means for enabling a processor to enable the template developer to store the generated at least one desktop application template in the desktop application template repository.

20. The computer program product of claim 18, wherein the application developer is a human application developer, wherein said second computer readable program code means comprises:

a fourth computer readable program code means for enabling a processor to enable the human application developer to input the configuration information into a form provided by the selected desktop application template.

21. The computer program product of claim 20, wherein said fourth computer readable program code means comprises:

a fifth computer readable program code means for enabling a processor to enable the human application developer to access the form over the Internet; and a sixth computer readable program code means for enabling a processor to display the form as a hypertext markup language (HTML) form.

22. The computer program product of claim 18, wherein the application developer is a developer program module, wherein said second computer readable program code means comprises:

a fourth computer readable program code means for an application programming interface configured to enable a processor to receive configuration information; and a fifth computer readable program code means for enabling a processor to enable the developer program module to provide the configuration information to the application programming interface over the Internet.

23. The computer program product of claim 18, further comprising:

a fourth computer readable program code means for enabling a processor to store the generated desktop application in a desktop application repository.

24. The computer program product of claim 23, further comprising:

a fifth computer readable program code means for enabling a processor to enable a user to retrieve the generated desktop application from the desktop application repository.

* * * * *

UNITED STATES PATENT AND TRADEMARK OFFICE
CERTIFICATE OF CORRECTION

| | | |
|---|---|---|
| PATENT NO. | : 8,166,455 B2 | Page 1 of 1 |
| APPLICATION NO. | : 11/770411 | |
| DATED | : April 24, 2012 | |
| INVENTOR(S) | : Laurie Voss | |

It is certified that error appears in the above-identified patent and that said Letters Patent is hereby corrected as shown below:

On Title page, in field (56), under "OTHER PUBLICATIONS", in column 2, line 10, delete "twcows" and insert -- tucows --, therefor.

Signed and Sealed this
Twenty-sixth Day of June, 2012

David J. Kappos
*Director of the United States Patent and Trademark Office*